United States Patent Office 2,742,411
Patented Apr. 17, 1956

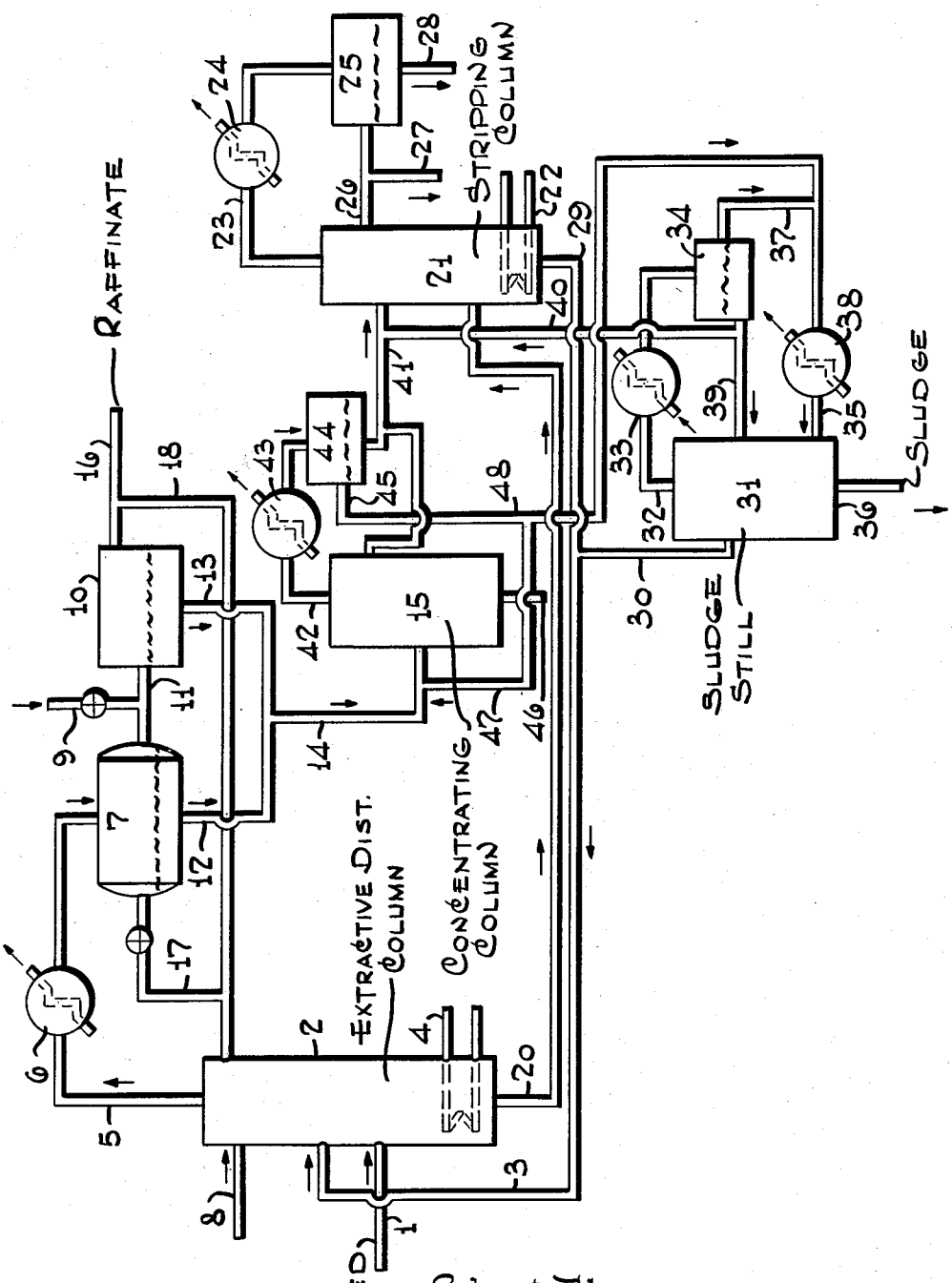

2,742,411

RECOVERY OF FURFURAL IN EXTRACTIVE DISTILLATION PURIFICATION OF CYCLIC HYDROCARBONS

Robert F. Leary, Cranford, Lester M. Welch, Madison, and Daniel S. Maisel, Roselle, N. J., assignors to Esso Research and Engineering Company, a corporation of Delaware Application September 13, 1951, Serial No. 246,452

5 Claims. (Cl. 202—39.5)

This invention relates to improvements in using furfural for extractively distilling aliphatic hydrocarbons from cyclic hydrocarbons, e. g., paraffins from cycloparaffins, and aliphatics from aromatics. It is concerned particularly with steps of recovering the furfural in a suitably purified and water-free condition for reuse in the extractive distillation.

Furfural has been mentioned in the prior art as one of several solvents that might be used for separating cyclic hydrocarbons by extractive distillation from mixtures containing close-boiling hydrocarbons, e. g., aromatic or napthenic hydrocarbons from paraffins and olefins. However, mostly on account of difficulties experienced in losses of furfural thus used, it was not successfully employed on an industrial scale for the purification of aromatic or cyclic hydrocarbons.

Difficulties arising in the use of furfural for separating $C_6$–$C_7$ cyclic hydrocarbons have been investigated more specifically and can now be overcome in accordance with the present invention. It is found that furfural tends to azeotrope with the non-aromatic raffinate, particularly in the separation of aliphatic $C_7$–$C_8$ hydrocarbons boiling in the range of 80° C. to 125° C. The loss of furfural becomes so excessive in this manner as to render the process unattractive economically, unless suitable steps can be used to satisfactorily reduce this loss. In the extractive distillation zone, it is important to keep the furfural solvent free from water to prevent formation of two phases which would cause unstable tower operation and to minimize corrosion and loss of solvent by polymer formation. At the same time, in the recovery of the furfural solvent from the extract it is advantageous to employ water in the form of steam for separating furfural from polymer sludges that are inevitably formed in the extractive distillation and in stripping the desired hydrocarbon product from the extract. It was found, therefore, that considering all these factors, a needed improvement was the recovery of more furfural and efficient elimination of water from the furfural in a recovery system. Features of the present invention which are effective for this purpose involve concentrating the furfural and sending the water-wet furfural in the recovery system to the extract stripping zone at a suitable point so that the water is removed from the furfural without upsetting the desired stripping of the aromatic or cyclic hydrocarbon from the furfural.

Reference will be made to the accompanying drawing which shows a diagrammatic flow scheme for the process.

As shown in the drawing, a suitable $C_6$ or $C_7$ hydrocarbon cut for the extractive distillation is sent as a feed stream through line 1 into an intermediate part of the extractive distillation column 2. Dry (substantially water-free) furfural is introduced into an upper part of column 2 from line 3 to flow downwardly in the column at a rate of one to 10 times the feed weight rate of the hydrocarbons entering from line 1. The heat input to the column, e. g., with the aid of a conventional reboiler heat exchanger 4, is so adjusted that the weight rate of vapors taken overhead from the column through line 5 is about equal to the weight rate of non-aromatic or non-cyclic components in the feed entering the column. The overhead vapors, termed raffinate vapors, are passed through a cooling condenser 6 to a receiving vessel 7.

In separating non-aromatics from benzene with sufficient fractionation above the solvent feed plate, i. e., the plate on which solvent from line 3 is introduced, only a small amount of furfural distills overhead but furfural tends to azeotrope over mostly with higher boiling $C_7$ to $C_8$ aliphatic hydrocarbons that tend to be present to a greater extent in a toluene raffinate. Thus, it was indicated that particularly in the treatment of mixtures containing substantial amounts of $C_7$–$C_8$ hydrocarbons, it is desirable to inject a well-controlled amount of water by line 8 at one of the top plates, preferably between 3 to 10 plates above the solvent feed plate to reduce the amount of furfural going overhead from the column. The small amount of water thus injected is prevented from flowing downwardly below the solvent feed plate by being of sufficiently small amount to azeotrope overhead completely with the amount of raffinate hydrocarbon being removed.

Even when small amounts of water are introduced in the extractive distillation of a toluene cut, some furfural was found to remain in the overhead vapors and thus required water washing of the raffinate condensate that enters receiver 7. The water washing was found to be best accomplished by adding water in stages; accordingly, wash water is introduced by line 9 into the portion of the hydrocarbon raffinate which is passed from receiver 7 to a second vessel 10 through line 11, and this may be repeated in further vessels as desired. The used wash water is separated from the raffinate in vessels 7 and 10, etc., as bottom layers, which are withdrawn through lines 12 and 13. The withdrawn wash water contains small amounts of furfural, and is passed through a line 14 to a concentrator 15.

The washed hydrocarbon raffinate decanted from vessel 7 to subsequent vessel 10, etc., is withdrawn from the system through line 16 as a product, but portions of the washed raffinate, as from vessels 7 and 10, are refluxed via lines 17 and 18 to the upper part of the extractive distillation column 2. The refluxed washed raffinate is returned to the top of column 2 at a ratio which will keep the hydrocarbon concentration on the plates of column 2 at a desirable level, for example, 10 to 35 per cent.

The cyclic hydrocarbon extract is withdrawn from the bottom of the extractive distillation column 2 by line 20 to be introduced into an intermediate part of an extract stripping column 21, which is operated to distill off the extracted cyclic hydrocarbon, e. g., such as benzene, toluene, or cyclohexane, depending upon the initial feed. Adequate heat is supplied to column 21, as with the aid of a bottom heat exchanger 22, to distill off completely the cyclic hydrocarbon and make the higher boiling furfural solvent flow downwardly to the bottom part of the column. The cyclic hydrocarbon vapors are withdrawn overhead through line 23 and are passed through a cooling condenser 24 into a receiver 25. A portion of the condensed cyclic hydrocarbon is refluxed to an upper plate of the column 21 by line 26. The remaining cyclic hydrocarbon condensate is withdrawn as the desired purified product through line 27.

It was found that in controlling the operation of the stripping column 21 to effect a complete separation of the cyclic hydrocarbon from the furfural solvent it was possible to obtain advantageous results if a stream of furfural containing a small amount of water is introduced substantially above the extract feed plate. In doing this, the small amount of water so injected is readily taken overhead by the cyclic hydrocarbon and the furfural flows downwardly to be recovered in a water-free condition with the desorbed furfural extract. With this operation, the condensate passed into receiver 25 separates into an upper cyclic hydrocarbon layer and a relatively small water layer which contains only a trace of furfural. This separated lean water layer is withdrawn from the receiver 25 through line 28. The furfural bottoms substantially freed of the cyclic hydrocarbon and free of water is withdrawn from the bottom of column 21 through line 29. A large portion of this withdrawn dry furfural bottoms is then in suitable condition for recycling by way of line 3 to the solvent feed plate of the extractive distillation column 2. However, in order to avoid excessive accumulation of polymer sludge that tends to be formed in the furfural subjected to the high temperatures in the columns 2 and 21 and to avoid an increase in rate of sludge formation due to the autocatalytic nature of the sludge forming reaction, a portion of the bottoms furfural from column 21 has to be diverted through line 30 to a sludge separation still 31 for separation.

As part of the recovery system, still 31 is provided for distilling the furfural away from the high boiling and relatively non-volatile sludge polymers. The furfural vapors are distilled overhead with steam from still 31 and are passed by line 32 through a condenser 33, thence as condensate into a receiver 34. In receiver 34, a bottom condensate layer becomes separated from an upper aqueous layer because the furfural is stripped from the polymer sludge with the use of steam injected by line 35. It is important to introduce the steam in the bottom of column 31 in order to prevent degradation of the furfural at the high temperature necessary as it is vaporized from the sludge. The sludge bottoms are withdrawn by line 36. The steam that is injected through line 35 may be obtained from any of the so-called lean water streams indicated to be separated in the washing of the raffinate and in the stripping of the cyclic hydrocarbon. Also, a substantial amount of this steam is obtainable by recycling the upper water layer from the receiver 34 through line 37 and through a head exchanger 38 for converting the water into steam.

In the receiver 34, the aqueous furfural condensate separates into two layers as mentioned; the heavier or bottom layer contains about 95 weight percent of furfural and 5 weight percent of water while the upper aqueous layer contains about 8.5 weight percent furfural and 91.5 weight percent water. A portion of the heavier bottom layer rich in furfural is refluxed from receiver 34 to the upper part of column 31 through line 39. A remaining portion of this heavy furfural-rich layer constitutes the main furfural recovery material that has to be freed of water before it can be reused in the extraction distillation. It is this material which was found excellently adapted for injection into the upper part of the extract stripping column 21 for efficient recovery of the furfural. This slightly aqueous furfural is passed by line 40 to the upper part of stripping column 21.

To supplement the quantity of slightly aqueous furfural (95 weight percent furfural, 5 weight percent water) passed by line 40 into the upper part of stripping column 21, a slightly aqueous furfural of similar composition is obtained from distillate of the concentrating column 15 and is added by line 41.

In the concentrating column 15, the wash water from line 14 containing about 1 to 2 weight percent furfural is subjected to fractional distillation to distill overhead an aqueous furfural azeotrope that contains 35 weight percent furfural and 65 weight percent water. The distillate is taken overhead from column 15 through line 42, condensed in condenser 43, then settled in receiver 44 into two layers, an upper water-rich layer (91.5 weight percent water, 8.5 weight percent furfural) and a heavier, slightly aqueous furfural layer (95 weight percent furfural, 5 weight percent water) as the bottom layer. A portion of the bottom layer is refluxed by line 45 into the upper part of the concentrating column 15, the remaining portion of the slightly aqueous furfural is sent through line 41 to be introduced into the upper part of the stripping column 21 as earlier mentioned. Water stripped of furfural is withdrawn as bottoms from column 15 through line 46 and can be used if desired for washing the raffinate of the extractive distillation or in any part of the system where water substantially free of furfural may be needed. The upper aqueous phase separated in the receiver 44 may be partly recycled as by line 47 to the concentrating column 15 for further recovery of more concentrated furfural therefrom. A remaining portion of the upper layer from receiver 44 is suitably passed by line 48 through heater 38 to supply steam to the bottom part of the sludge still 31 where the furfural content of this material is recovered together with the furfural being distilled from the polymer sludge.

In the type of operation that has been described, the following table illustrates the quantities of the various streams that might be employed in the recovery of toluene, as an example:

TABLE

*Example of extractive distillation of crude toluene cut (85° C. to 115° C.)*

| | Parts by weight |
|---|---|
| Hydrocarbon feed to extractive distillation column 2 | 100 |
| Dry furfural solvent feed to column 2 | 450 |
| Water supplied to upper part of column 2 | 9 |
| Overhead distillate from column 2 (60 raffinate, 9 H$_2$O, 1.8 furfural) | 70.8 |
| Extract bottoms from column 2 | 488.2 |
| Spent wash water (180 H$_2$O, 1.8 furfural) | 181.8 |
| Furfural diverted from recycle to sludge still | 20 |
| Slightly aqueous furfural to stripping column 21 (21.7 furfural, 1.1 H$_2$O) | 22.8 |
| Water supplied to sludge still | 40 |

As a further clarification of this example, the conditions which would be encountered in the columns running at about atmospheric pressure are as follows:

1. EXTRACTION TOWER—60 PLATES, 3/1 REFLUX

| Point | Plates from Top | Temperature, °C. |
|---|---|---|
| Top | | 84 |
| Water Inlet | 10 | 86 |
| Solvent Inlet | 15 | 104 |
| Hydrocarbon Feed Inlet | 30 | 125 |
| Bottom | 60 | 152 |

2. FURFURAL CONCENTRATING COLUMN—20 PLATES, 1/1-5/1 REFLUX

| Point | Plates from Top | Temperature, °C. |
|---|---|---|
| Top | | 97.5 |
| Feed Inlet | 16 | 99 |
| Bottoms | 20 | 100 |

3. EXTRACT STRIPPING COLUMN—40 PLATES, 3/1 REFLUX

| Point | Plates from Top | Temperature, °C. |
|---|---|---|
| Top | | 108 |
| Aqueous Furfural Inlet | 15 | 110 |
| Extract Feed | 30 | 120 |
| Bottom | 40 | 161.5 |

In carrying out the process outlined a suitable hydrocarbon fraction containing benzene, toluene, or cyclohexane as the cyclic hydrocarbon should have an end point not more than about 6° to 10° C. above the boiling point of the cyclic hydrocarbon to be recovered; and should be even closer if it can be made so without losing prohibitive amounts of the cyclic hydrocarbon. It will be understood that if the hydrocarbon components present have boiling points too far above that of the cyclic hydrocarbon to be extracted, they become difficult to distill away from the furfural extract in the extractive distillation. The hydrocarbon feed cut is also preferably pretreated to reduce the amounts of highly reactive substances, particularly tertiary olefins and conjugated diolefins, which have a tendency to increase the loss of solvent by sludge formation while the solvent is exposed to high temperature in the presence of these reactive compounds.

Investigations show that furfural is an extractive solvent which has strong tendencies to azeotrope with the $C_7$ to $C_8$ hydrocarbons which contaminate the $C_6$–$C_7$ cyclic hydrocarbons, but that injection of water reduces this tendency.

In the desired separation of benzene, the raffinate $C_7$ hydrocarbons include heptenes and heptanes. In the purification of cyclohexane, the contaminants to be removed as raffinate include dimethylpentanes. In the purification of toluene, $C_7$ and $C_8$ compounds are present in the raffinate.

For example, it was found that the total raffinate extractively distilled from a toluene cut contained 6.4 weight percent furfural when the extractive distillation was conducted in a 50 plate column having 5 plates above the solvent feed plate. This high carry-over is due to a tendency for azeotrope formation, as shown by distilling the raffinate from furfural batchwise in a 30 plate column at 20/1 reflux ratio, in which case amounts of furfural ranging from 1.8 to 8.7 per cent were found in the overhead as successive small cuts were taken. When water was injected into the batch column under the same conditions, the amount of furfural in the overhead was reduced to 0.1 to 1.8 per cent as successive cuts were taken. (The amount of furfural in the azeotrope increases as the boiling point of the hydrocarbon is increased.) Similarly, a continuous separation of furfural and this raffinate with 30 plates of 3/1 reflux ratio showed only 0.6 to 0.8 per cent furfural in the raffinate taken overhead when 15 per cent water (based on raffinate) was injected.

However, in injecting this water, care should be taken to avoid having any appreciable amount of water pass downwardly into the extractive distillation zone below the solvent feed plate, principally to limit the corrosive and polymerizing action of wet furfural. Since the addition of water results in the formation of two phases, with a corresponding lowering of temperature, when the limit of solubility of water in the hydrocarbon-furfural mixture is reached, the zone of appreciable water concentration in the tower is readily detected by temperature measurements. This zone can be limited to regions above the solvent feed plate, by limiting the amount of water added to that which can be azeotroped overhead by the raffinate hydrocarbons. It is evident that the water can be added in the proper manner to reduce the amount of furfural carried overhead by the raffinate vapor, and thus drastically reduce the amount of water required for water washing. There is a tremendous saving obtained by lowering the amount of wash water, because reconcentrating the furfural from the wash water and drying the reconcentrated furfural are important expense items.

The features of the invention are summarized as follows:

(a) The furfural solvent used in the extractive distillation zone for purifying $C_6$–$C_7$ cyclic hydrocarbons is maintained substantially free of water.

(b) To reduce the amount of furfural carried overhead by raffinate $C_7$–$C_8$ hydrocarbons distilled from the extractive distillation zone, a controlled small amount of water is introduced into the raffinate vapors above the extractive distillation zone, so that substantially all the thus introduced water is carried overhead and cannot go back down to the extractive distillation zone.

(c) Additional amounts of water required for recovering remaining small amounts of furfural from the condensed raffinate are sufficiently low to permit efficient operation of the furfural recovery system, wherein the furfural is concentrated to a slightly aqueous state.

(d) The slightly aqueous furfural obtained as distillation products in concentrating the furfural from the aqueous wash liquid and in steam distilling furfural from polymer sludge can be efficiently dehydrated in an upper part of a stripping column where the $C_6$–$C_7$ cyclic hydrocarbon is desorbed from its furfural extract. Thus, all the furfural is finally obtained stripped free of the aromatic hydrocarbon product or cyclic hydrocarbon product, and at the same time stripped free of water in order to be available for recycle to the extractive distillation zone.

What is claimed is:

1. In a process of separating a $C_6$–$C_7$ cyclic hydrocarbon from a mixture containing $C_7$–$C_8$ aliphatic hydrocarbons boiling in the range of 80° to 125° C. by extractive distillation in the presence of water-free furfural as solvent, the steps which comprise adding water to overhead hydrocarbon distillate of the extractive distillation to form aqueous wash liquid, removing furfural in said aqueous wash liquid from raffinate hydrocarbons distilled overhead from the extractive distillation zone, stripping furfural from the wash liquid to obtain a slightly aqueous concentrate of the furfural containing about 95 weight percent furfural and 5 weight percent of water, passing said concentrate of the furfural to an upper part of an extract stripping zone wherein the cyclic hydrocarbon is fractionally distilled from furfural extract formed by the extractive distillation, thereby obtaining a water-free furfural bottoms product in said extract stripping zone, and reusing the said water-free furfural bottoms of the extract stripping zone in the extractive distillation zone.

2. In a process of separating an aromatic hydrocarbon from other hydrocarbons boiling in the range of 80° to 125° C. by extractive distillation in the presence of water-free furfural as solvent, the steps which comprise supplying furfural substantially free of water to an extractive distillation zone at a solvent inlet point above a feed inlet of the hydrocarbons, introducing into the extractive distillation zone above the solvent inlet point a limited amount of water that can be carried overhead by raffinate hydrocarbons from the extractive distillation zone without passing down into the extractive distillation zone in order to substantially minimize the amount of furfural carried overhead, maintaining temperatures of 125° C. to 152° C. from the feed inlet of the hydrocarbons to the bottom of said extractive distillation zone separating an aqueous phase from raffinate hydrocarbons distilled overhead from the extractive distillation zone, recovering a slightly aqueous furfural concentrate by distillation from said aqueous phase, drying the furfural concentrate by removing water therefrom and returning water-free furfural of said concentrate to the solvent inlet point of said extractive distillation zone.

3. In a process of separating an aromatic hydrocarbon from a mixture with other hydrocarbons boiling in the range of 80° to 125° C. by extractive distillation in the presence of dry furfural as solvent, the steps which comprise removing furfural in an aqueous phase from raffinate distilled in the extractive distillation, recovering a slightly aqueous furfural distillate from said dilute furfural aqueous phase, stripping the aromatic hydrocarbon from furfural extract obtained in the extractive distillation to recover the furfural solvent substantially free of water as a bottoms product, passing a portion of the said bottoms product from the extract stripping zone to a distillation zone in which the furfural is steam distilled away from sludge-forming polymers, recovering a slightly aqueous furfural concentrate from said distillation zone as a distillate phase, treating said slightly aqueous furfural concentrates to remove water therefrom and passing the resulting dry furfural back to the extractive distillation zone, and maintaining temperatures of 125° C. to 152°

C. from an inlet point for the hydrocarbon mixture to the bottom of the extractive distillation zone.

4. In a process of separating an aromatic hydrocarbon from a mixture with close-boiling non-aromatic hydrocarbons boiling in the range of 80° to 125° C. by extractive distillation in the presence of dry furfural as solvent, the steps which comprise removing furfural in an aqueous phase from the non-aromatic hydrocarbons distilled in the extractive distillation by admixing water with said non-aromatic hydrocarbons and separating the resulting aqueous wash liquid, distilling an aqueous concentrate of the furfural from said aqueous wash liquid, stripping the aromatic hydrocarbon from furfural extract obtained as a bottoms product in the extractive distillation by admixing said aqueous furfural concentrate so that water is distilled together with the aromatic hydrocarbon to leave dry furfural as a residual product, distilling from a portion of said residual product an aqueous concentrate of furfural to obtain a wet furfural distillate freed of sludge-forming substances, and removing water from the aqueous furfural distillate by distillation of the water with aromatic hydrocarbons contained in furfural extract withdrawn from said extractive distillation zone.

5. In a process of separating an aromatic hydrocarbon from a mixture thereof with nonaromatic hydrocarbon boiling in the range of 80° to 125° C. by extractive distillation in the presence of anhydrous furfural as solvent, the steps which comprise flowing anhydrous furfural down through an extractive distillation zone countercurrent to nonaromatic hydrocarbon vapors being distilled as raffinate from the mixture, introducing into the raffinate hydrocarbons above the extractive distillation zone a controlled amount of water limited to between 10 and 20 weight percent of the raffinate hydrocarbons to reduce substantially the amount of furfural carried by the raffinate hydrocarbon vapors above the extractive distillation zone but to prevent any appreciable amount of water from flowing down through the extractive distillation zone, condensing the aqueous raffinate vapors withdrawn overhead from a fractionation zone above the extractive distillation zone, separating the raffinate condensate from aqueous condensate of said overhead aqueous raffinate vapors, refluxing a portion of the raffinate condensate to said fractionation zone above the extractive distillation zone, distilling from said aqueous condensate an aqueous concentrate of furfural containing about 95 weight percent of furfural and 5 weight percent of water, admixing furfural extract of the aromatic hydrocarbon withdrawn as a bottoms product from the extractive distillation zone with said aqueous concentrate of furfural, and distilling aromatic hydrocarbon together with water from the mixture of furfural concentrate and furfural extract to recover anhydrous furfural as a stripped bottoms product.

References Cited in the file of this patent

UNITED STATES PATENTS

| | | |
|---|---|---|
| 1,615,991 | Mason | Feb. 1, 1927 |
| 2,288,126 | Dunn et al. | June 30, 1942 |
| 2,350,584 | Buell | June 6, 1944 |
| 2,411,785 | Hackmuth | Nov. 26, 1946 |
| 2,442,474 | Scarth | June 1, 1948 |
| 2,520,006 | Hibshman | Aug. 22, 1950 |

FOREIGN PATENTS

| | | |
|---|---|---|
| 513,566 | Great Britain | Jan. 3, 1938 |

OTHER REFERENCES

Dunn et al.: "Toluene Recovery by Extractive Distillation," Transactions of American Institute of Chemical Engineers, vol. 41, pp. 631–644 (Oct. 25, 1946).